US009160158B2

(12) United States Patent
Schweitzer, III et al.

(10) Patent No.: US 9,160,158 B2
(45) Date of Patent: Oct. 13, 2015

(54) COORDINATED HIGH-IMPEDANCE FAULT DETECTION SYSTEMS AND METHODS

(71) Applicant: Schweitzer Engineering Laboratories, Inc., Pullman, WA (US)

(72) Inventors: Edmund O. Schweitzer, III, Pullman, WA (US); Mangapathirao Venkata Mynam, Pullman, WA (US); Daqing Hou, Des Moines, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 147 days.

(21) Appl. No.: 14/052,449

(22) Filed: Oct. 11, 2013

(65) Prior Publication Data

US 2014/0104738 A1    Apr. 17, 2014

Related U.S. Application Data

(60) Provisional application No. 61/713,392, filed on Oct. 12, 2012.

(51) Int. Cl.
    *H02H 3/08* (2006.01)
    *H02H 3/52* (2006.01)
    *H02H 7/26* (2006.01)

(52) U.S. Cl.
    CPC . *H02H 3/08* (2013.01); *H02H 3/52* (2013.01); *H02H 7/261* (2013.01)

(58) Field of Classification Search
    CPC ............ H02H 3/08; H02H 3/53; H02H 7/261
    USPC .......................................................... 361/42
    See application file for complete search history.

(56) References Cited

U.S. PATENT DOCUMENTS

| 4,138,664 A | 2/1979 | Conforti |
| 4,297,738 A | 10/1981 | Lee |

(Continued)

FOREIGN PATENT DOCUMENTS

| EP | 0307826 | 3/1992 |
| WO | 0122104 | 3/2001 |
| WO | 2006044354 | 4/2006 |

OTHER PUBLICATIONS

PCT/US2013/064695, Patent Cooperation Treaty, International Search Report and Written Opinion of the International Searching Authority, Feb. 3, 2014.

(Continued)

*Primary Examiner* — Scott Bauer
(74) *Attorney, Agent, or Firm* — John P. Davis; Richard M. Edge

(57) ABSTRACT

Systems and methods are presented for detecting high-impedance faults (HIFs) in an electric power delivery system using a plurality of coordinated high-impedance fault detection systems. In certain embodiments, a method for HIFs may include receiving first and second current representations associated with first and second locations of the electric power delivery system respectively. Based on at least one of the first and second current representations, the occurrence of an HIF may be determined. A relative location of the HIF may be determined based on a relative amount of interharmonic content associated with an HIF included in the first and second current representations, and a protective action may be taken based on the determined relative location.

20 Claims, 9 Drawing Sheets

(56) References Cited

U.S. PATENT DOCUMENTS

| | | |
|---|---|---|
| 4,297,740 A | 10/1981 | Hagberg |
| 4,297,783 A | 11/1981 | Casey, Jr. |
| 4,313,146 A | 1/1982 | Lee |
| 4,347,542 A | 8/1982 | Calhoun |
| 4,357,644 A | 11/1982 | Schmidt |
| 4,367,422 A | 1/1983 | Leslie |
| 4,402,028 A | 8/1983 | Udren |
| 4,466,071 A | 8/1984 | Russell, Jr. |
| 4,562,550 A | 12/1985 | Beatty |
| 4,728,866 A | 3/1988 | Capewell |
| 4,736,432 A | 4/1988 | Cantrell |
| 4,811,210 A | 3/1989 | McAulay |
| 4,851,782 A | 7/1989 | Jeerings |
| 4,871,971 A | 10/1989 | Jeerings |
| 4,878,142 A | 10/1989 | Bergman |
| 4,939,516 A | 7/1990 | Early |
| 5,139,745 A | 8/1992 | Barr |
| 5,341,265 A | 8/1994 | Westrom |
| 5,452,223 A | 9/1995 | Zuercher |
| 5,475,556 A | 12/1995 | Yoon |
| 5,485,093 A | 1/1996 | Russell |
| 5,506,789 A | 4/1996 | Russell |
| 5,512,832 A | 4/1996 | Russell |
| 5,521,946 A | 5/1996 | Main |
| 5,537,327 A | 7/1996 | Snow |
| 5,550,751 A | 8/1996 | Russell |
| 5,561,605 A | 10/1996 | Zuercher |
| 5,578,931 A | 11/1996 | Russell |
| 5,600,526 A | 2/1997 | Russell |
| 5,602,709 A | 2/1997 | Al-Dabbagh |
| 5,659,453 A | 8/1997 | Russell |
| 5,724,247 A | 3/1998 | Dalstein |
| 5,734,575 A | 3/1998 | Snow |
| 5,787,126 A | 7/1998 | Itoh |
| 5,835,321 A | 11/1998 | Elms |
| 5,847,913 A | 12/1998 | Turner |
| 5,896,302 A | 4/1999 | Goodpaster |
| 6,002,561 A | 12/1999 | Dougherty |
| 6,058,353 A | 5/2000 | Goodpaster |
| 6,195,241 B1 | 2/2001 | Brooks |
| 6,287,357 B1 | 9/2001 | Lynch et al. |
| 6,292,340 B1 | 9/2001 | O'Regan |
| 6,414,829 B1 | 7/2002 | Haun |
| 6,453,248 B1 | 9/2002 | Hart |
| 6,459,998 B1 | 10/2002 | Hoffman |
| 6,483,680 B1 | 11/2002 | Kulidjian |
| 6,812,715 B2 | 11/2004 | Chiozzi |
| 6,829,544 B1 | 12/2004 | Kasztenny |
| 6,934,654 B2 | 8/2005 | Benmouyal |
| 6,998,848 B2 | 2/2006 | Kereit |
| 7,072,427 B2 | 7/2006 | Rawlins |
| 7,630,863 B2 | 12/2009 | Zweigle |
| 7,720,619 B2 | 5/2010 | Hou |
| 7,945,400 B2 | 5/2011 | Hou |
| 2003/0085715 A1 | 5/2003 | Lubkema |
| 2003/0146776 A1 | 8/2003 | Nakase |
| 2004/0120090 A1 | 6/2004 | Galli |
| 2005/0171647 A1 | 8/2005 | Kunsman |
| 2005/0212524 A1 | 9/2005 | Ennis |
| 2005/0231862 A1 | 10/2005 | Peterson |
| 2006/0085146 A1 | 4/2006 | Peterson |
| 2006/0215335 A1 | 9/2006 | Deshpande |
| 2007/0055889 A1 | 3/2007 | Henneberry |
| 2008/0031520 A1 | 2/2008 | Hou |
| 2010/0039741 A1 | 2/2010 | Booth |
| 2012/0090396 A1* | 4/2012 | Zhou et al. ..................... 73/645 |

OTHER PUBLICATIONS

PCT/US2007/011603, Patent Cooperation Treaty, International Search Report and Written Opinion of the International Searching Authority, Feb. 14, 2008.

PCT/US2007/011602, Patent Cooperation Treaty, International Search Report and Written Opinion of the International Searching Authority, Jul. 21, 2008.

* cited by examiner

COORDINATED HIGH-IMPEDANCE FAULT DETECTION SYSTEMS AND METHODS

RELATED APPLICATIONS

This application claims priority under 35 U.S.C. §119(e) to U.S. Provisional Patent Application No. 61/713,392, filed Oct. 12, 2012, titled "Coordination of High-Impedance Fault Detection," which is hereby incorporated by reference in its entirety.

TECHNICAL FIELD

This disclosure relates to systems and methods for detecting high-impedance faults in an electric power delivery system and, more particularly, to systems and methods for detecting high-impedance faults in an electric power delivery using a plurality of coordinated high-impedance fault detection systems.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
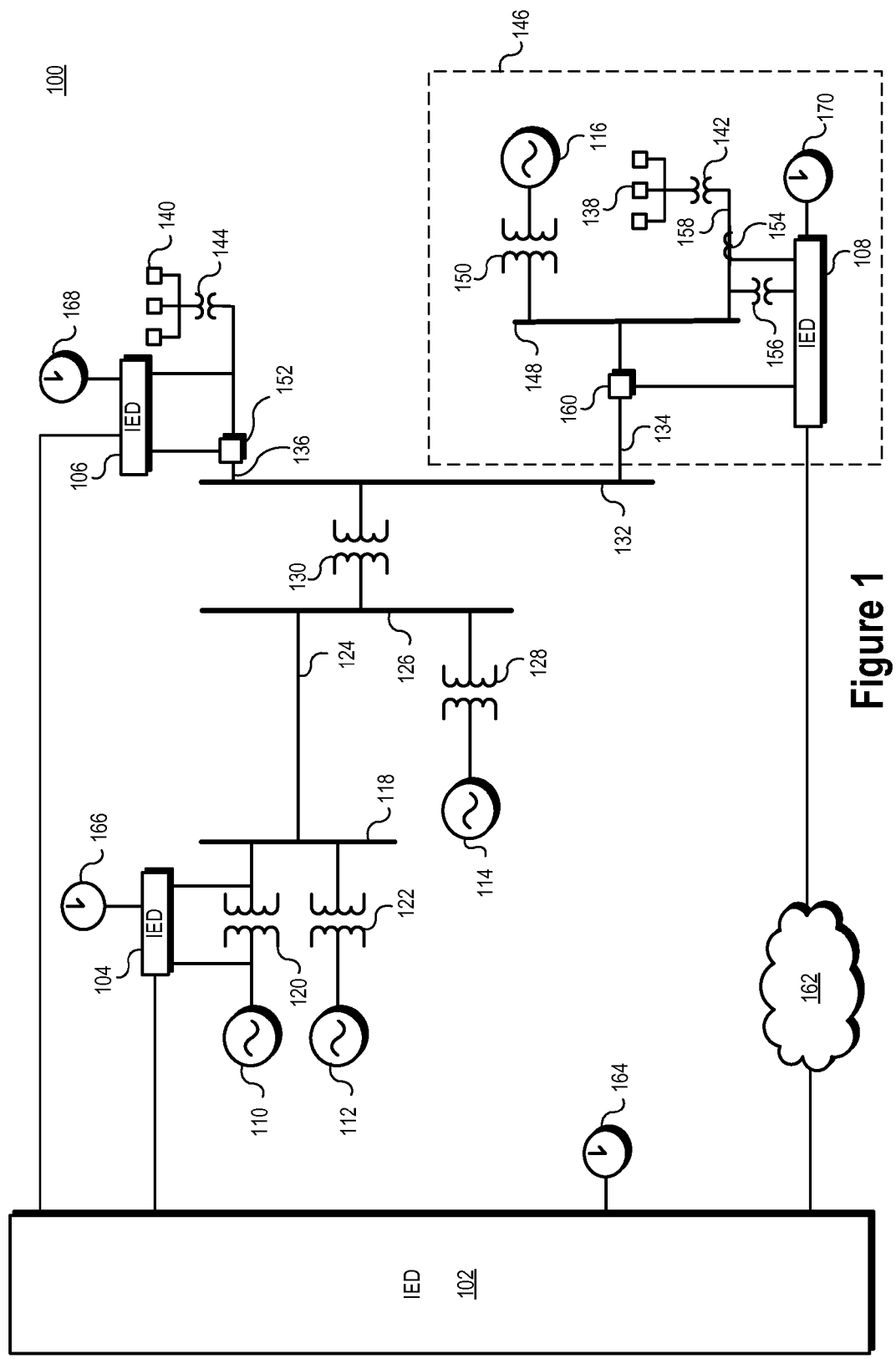
FIG. 1 illustrates a simplified diagram of one embodiment of an electric power delivery system that includes intelligent electronic devices consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments described are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include a variety of equipment, such as electrical generators, electrical motors, power transformers, power transmission and distribution lines, circuit breakers, switches, buses, transmission and/or feeder lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static var compensator (SVC), on-load tap-changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Electrical power delivery system equipment may be monitored and protected from various malfunctions and/or conditions using one or more IEDs. For example, an IED may be configured to detect and protect the electrical power system equipment from abnormal conditions, such as high-impedance fault (HIF) events. HIF events may occur, for example, on a distribution feeder line of an electric power delivery system due to a variety of conditions. For example, downed feeder lines, intrusion onto a line (e.g., as may occur when a tree or other object contacts the line), and/or the like may cause HIF events.

HIF events may pose a safety risk and/or damage an electrical power delivery system and/or its constituent components. Accordingly, detecting HIF events and implementing one or more suitable protective actions (e.g., disconnecting a portion of an electrical power delivery system experiencing an HIF) may mitigate potential harm caused by damage an electrical power delivery system. HIF event detection may utilize a variety of techniques and/or algorithms, including the techniques detailed in U.S. Pat. Nos. 7,720,619 and 7,945,400, both assigned to Schweitzer Engineering Laboratories, Inc. and incorporated herein by reference in their entireties. In certain circumstances, HIF events may be difficult to detect because HIF events may not introduce overcurrent conditions sufficient to trigger a detection element of a protective IED.

IEDs monitoring a portion of an electrical power delivery system located nearer to an HIF may be better able to detect the HIF event due to their proximity to the fault. For example, an IED monitoring a portion of an electrical power delivery system located nearer to an HIF may observe relatively larger overcurrent and/or interharmonic and/or other signals associated with the fault condition than an IED monitoring a portion of the system located further from the fault. In certain embodiments, an interharmonic may comprise signals with frequencies that are not integer multiples of a fundamental frequency of the electric power delivery system. For example, in North America, the fundamental frequency of typical electric power delivery systems is 60 Hz. Accordingly, harmonic frequencies in such systems include 120 Hz, 180 Hz, 240 Hz, etc. Interharmonic frequencies are those frequencies other than harmonic frequencies and/or fundamental frequencies.

Consistent with embodiments disclosed herein, a plurality of IEDs may be utilized in connection with HIF event detection to more accurately detect HIF events and implement suitable protective actions to mitigate potentially unsafe conditions and damage to the electrical power delivery system. In certain embodiments, utilizing a plurality of IEDs to detect HIF events may allow for a more accurate determination of a location of the HIF event.

FIG. 1 illustrates a simplified diagram of an electric power generation and delivery system 100 that includes IEDs 102-108 consistent with embodiments disclosed herein. Although illustrated as a one-line diagram for purposes of simplicity, electrical power generation and delivery system 100 may also be configured as a three phase power system. Moreover, embodiments disclosed herein may be utilized by any electric power generation and delivery system and is therefore not limited to the specific system 100 illustrated in FIG. 1. Accordingly, embodiments may be integrated, for example, in industrial plant power generation and delivery systems, deep-water vessel power generation and delivery systems, ship power generation and delivery systems, distributed generation power generation and delivery systems, and utility electric power generation and delivery systems.

The electric power generation and delivery system 100 may include generation, transmission, distribution, and power consumption equipment. For example, the system 100 may include one or more generators 110-116 that, in some embodiments, may be operated by a utility provider for generation of electrical power for the system 100. Generators 110 and 112 may be coupled to a first transmission bus 118 via step up transformers 120 and 122, which are respectively configured to step up the voltages provided to first transmission bus 118. A transmission line 124 may be coupled between the first transmission bus 118 and a second transmission bus 126. Another generator 114 may be coupled to the second transmission bus 126 via step up transformer 128 which is configured to step up the voltage provided to the second transmission bus 126.

A step down transformer 130 may be coupled between the second transmission bus 126 and a distribution bus 132 configured to step down the voltage provided by the second transmission bus 126 at transmission levels to lower distribution levels at the distribution bus 132. One or more feeders 134, 136 may draw power from the distribution bus 132. The feeders 134, 136 may distribute electric power to one or more loads 138, 140. In some embodiments, the electric power delivered to the loads 138, 140 may be further stepped down from distribution levels to load levels via step down transformers 142 and 144, respectively.

Feeder 134 may feed electric power from the distribution bus 132 to a distribution site 146 (e.g., a refinery, smelter, paper production mill, or the like). Feeder 134 may be coupled to a distribution site bus 148. The distribution site 146 may also include a distributed generator 116 configured to provide power to the distribution site bus 148 at an appropriate level via transformer 150. The distribution site 146 may further include one or more loads 138. In some embodiments, the power provided to the loads 138 from the distribution site bus 148 may be stepped up or stepped down to an appropriate level via transformer 142. In certain embodiments, the distribution site 146 may be capable of providing sufficient power to loads 138 independently by the distributed generator 116, may utilize power from generators 110-114, or my utilize both the distributed generator 116 and one or more of generators 110-114 to provide electric power to the loads.

IEDs 102-108 may be configured to control, monitor, protect, and/or automate the electric power system 100. As used herein, an IED may refer to any microprocessor-based device that monitors, controls, automates, and/or protects monitored equipment within an electric power system. In some embodiments, IEDs 102-108 may gather status information from one or more pieces of monitored equipment. Further, IEDs 102-108 may receive information concerning monitored equipment using sensors, transducers, actuators, and the like. Although FIG. 1 illustrates separate IEDs monitoring a signal (e.g., IED 104) and controlling a breaker (e.g., IED 108), these capabilities may be combined into a single IED.

FIG. 1 illustrates various IEDs 102-108 performing various functions for illustrative purposes and does not imply any specific arrangements or functions required of any particular IED. In some embodiments, IEDs 102-108 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. For example, IEDs 102-108 may be configured to monitor and communicate information relating to overcurrent and/or interharmonic and/or other signal conditions of a monitored line (e.g., a feeder and/or transmission line). Further, IEDs 102-108 may be configured to communicate calculations, such as phasors (which may or may not be synchronized as synchrophasors), events, fault distances, differentials, impedances, reactances, frequency, and the like. IEDs 102-108 may also communicate settings information, IED identification information, communications information, status information, alarm information, and the like. Information of the types listed above, or more generally, information about the status of monitored equipment, may be generally referred to herein as monitored system data.

In certain embodiments, IEDs 102-108 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

The distributed site 146 may include an IED 108 for monitoring, controlling, and protecting the equipment of the distributed site 146 (e.g., generator 116, transformer 142, etc.). IED 108 may receive monitored system data, including current signals via current transformer (CT) 154 and voltage signals via potential transformer (PT) 156 from one or more locations (e.g., line 158) in the distribution site 146. The IED 108 may further be in communication with a breaker 160 coupled between the feeder 134 and the distribution site bus 148. In certain embodiments, the IED 108 may be configurable to cause the breaker 160 to disconnect the distribution site bus 148 from the distribution bus 132, based on monitored system data received via CT 154 and PT 156.

Feeder 136 may be communicatively coupled with an IED 106. The IED 106 may be configured to control a breaker 152 between the loads 140 and the distribution bus 132 based on monitored system data. In some embodiments, the power provided to the loads 140 from the distribution bus 132 may be stepped up or stepped down to an appropriate level via transformer 144. Like the IED 108 of the distribution site 146, monitored system data may be obtained by IED 106 using CTs and/or PTs (not shown).

Other IEDs (e.g., IED 104) may be configured to monitor, control, and/or protect the electric power generation and delivery system 100. For example IED 104 may provide transformer and generator protection to the step-up transformer 120 and generator 110. In some embodiments, IEDs 104-108 may be in communication with another IED 102, which may be a central controller, synchrophasor vector processor, automation controller, programmable logic controller (PLC), real-time automation controller, Supervisory Control and Data Acquisition (SCADA) system, or the like. For example, in some embodiments, IED 102 may be a synchrophasor vector processor, as described in U.S. Patent Application Publication No. 2009/0088990, which is incorporated herein by reference in its entirety. In other embodiments, IED 102 may be a real-time automation controller, such as is described in U.S. Patent Application Publication No. 2009/0254655, which is incorporated herein by reference in its entirety. IED 102 may also be a PLC or any similar device capable of receiving communications from other IEDs and processing the communications there from. In certain embodiments, IEDs 104-108 may communicate with IED 102 directly or via a communications network (e.g., network 162).

The central IED 102 may communicate with other IEDs 104-108 to provide control and monitoring of the other IEDs 104-108 and the power generation and delivery system 100 as a whole. In some embodiments, IEDs 104-108 may be configured to generate monitored system data in the form of time-synchronized phasors (synchrophasors) of monitored currents and/or voltages. In some embodiments, synchrophasor measurements and communications may comply with the IEC C37.118 protocol. In certain embodiments, IEDs 102-108 may receive common time signals for synchronizing collected data (e.g., by applying time stamps for the like). Accordingly, IEDs 102-108 may receive common time signals from time references 164-170 respectively. In some embodiments, the common time signals may be provided using a Global Positioning System (GPS) satellite (e.g., IRIG), a common radio signal such as WWV or WWVB, a network time signal such as IEEE 1588, or the like.

Consistent with embodiments disclosed herein, IEDs 102-108 may be configured to detect and/or identify one or more HIF events from monitored system data. For example, IEDs 102-108 may be configured to receive current information and/or measurements (e.g., current measurements of a transmission and/or a feeder line) and, based on the current information and/or measurements, detect and/or identify HIF fault events. In certain embodiments, the HIF events may be detected and/or identified when monitored current information exhibits overcurrent conditions and/or associated interharmonic and/or harmonic signals. For example, in some embodiments, IEDs 102-108 may be configured to determine when monitored current signals include interharmonic signals associated with an HIF event that exceed one or more thresholds (e.g., thresholds indicating an HIF event). Based on a determination that the interharmonic signals exceed the one or more thresholds, IEDs 102-108 may detect the occurrence of an HIF event.

Although embodiments of the disclosed systems and methods are described herein as utilizing interharmonic content in measured current information to identify HIFs, in further embodiments, a variety of other suitable signals and/or signal content may alternatively and/or additionally be utilized. For example, in some embodiments, odd harmonic content associated with HIF events may be used to identify HIFs. Similarly, embodiments may utilize incremental changes of root mean square (RMS) signal information to identify HIFs.

In some embodiments, thresholds utilized to detect and/or identify HIF events may be adaptively tuned to account for normal system noise levels, thereby increasing the accuracy of HIF event detection and/or identification. For example, as discussed in more detail below, in some embodiments IEDs 102-108 may maintain a dynamic reference over time of interharmonic signals included in measured current signals. This long term reference may be utilized as a threshold for differentiating interharmonic signals attributed to normal system noise from interharmonic signals associated with HIF events.

Consistent with embodiments disclosed herein, a plurality of IEDs 102-108 may be utilized to detect HIF events and implement suitable protective actions to mitigate potentially unsafe conditions and damage to the electrical power delivery system 100. For example, as discussed above, an IED monitoring a portion of the electrical power delivery system 100 located nearer to an HIF may be better able to detect the fault event due to its proximity to the fault. For example, IED 108 may be able to more accurately detect HIF events associated with line 158 and/or the distribution site 146 than another remotely located IED (e.g., IED 104 and/or the like). In certain embodiments, IEDs located nearer to an HIF may be better able to detect the fault event due to higher interharmonic signal-to-noise ratios associated with an HIF event closer to the fault.

Detecting HIF events utilizing a plurality of IEDs may allow for determination of fault localization information relating to the HIF event. Based on relative signal-to-noise ratios associated with an HIF event, the locations of one or more IEDs 102-108 relative to a fault may be determined. For example, if interharmonic signal-to-noise ratios associated with an HIF event measured by a first IED are relatively higher than interharmonic signal-to-noise ratios associated with an HIF event measured by a second IED, it may be determined that the HIF is located nearer to the first IED.

Utilizing a plurality of IEDs 102-108 in the detection of HIF events may allow for prioritized implementation of protective actions by IEDs 102-108. For example, an IED located closer to a fault event may implement certain protective actions (e.g., tripping a breaker or the like) before other IEDs implement protective actions. In certain instances, if such a prioritized protective action resolves an HIF condition, further protective actions may not be necessary. If, however, the HIF condition is not resolved, additional protective may be implemented by the IED and/or other IEDs. Prioritized protective actions may be coordinated by IEDs 102-108 based on coordinated instructions exchanged therebetween. Alternatively or in addition, prioritized protective actions may be coordinated by a central IED 102. For example, based on monitored current information and/or detected HIF events at IEDs 104-108, central IED 102 may identify an IED of IEDs 104-108 located nearer to the fault and instruct the IED to implement one or more suitable protective actions.

Figure 2:
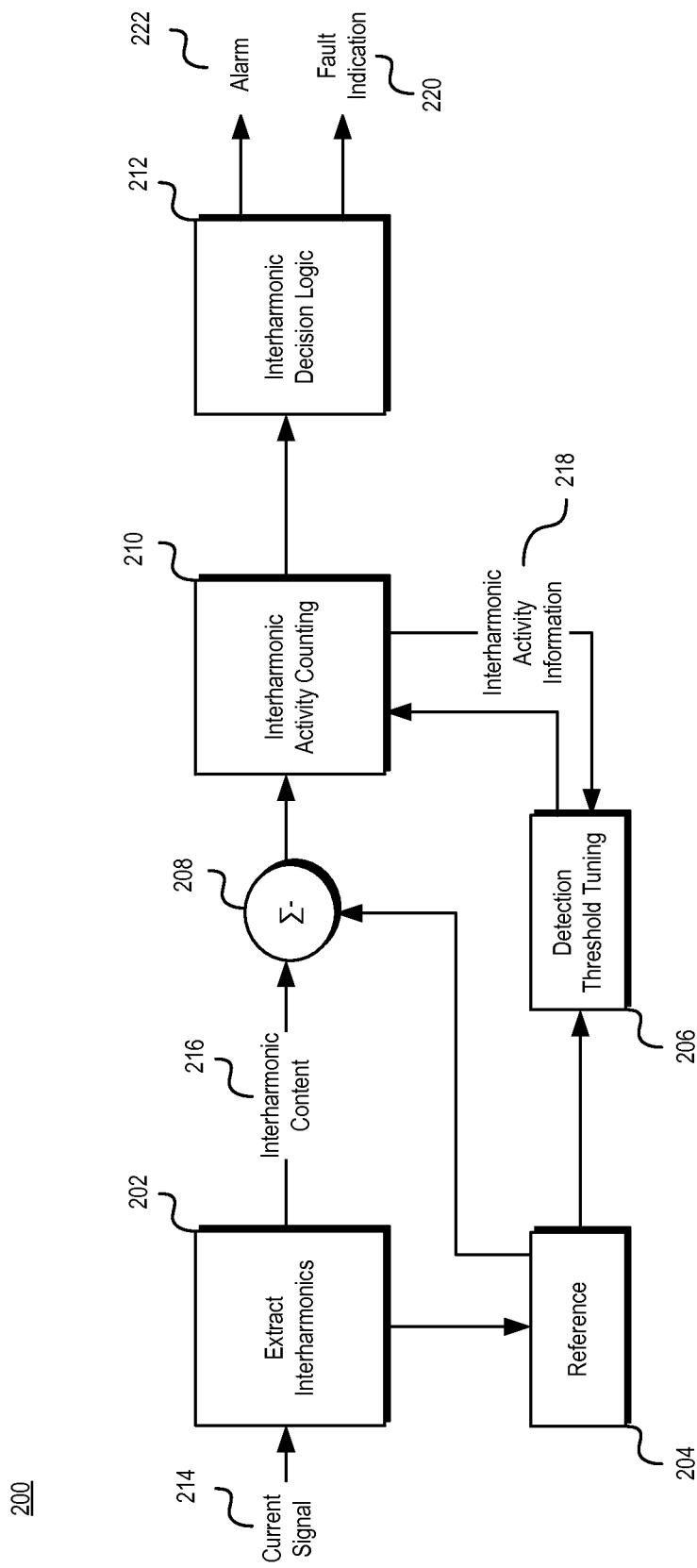
FIG. 2 illustrates a functional block diagram of a system for detecting high-impedance faults consistent with embodiments disclosed herein.

FIG. 2 illustrates a functional block diagram of a system 200 for detecting HIF events consistent with embodiments disclosed herein. In certain embodiments, the system 200 may comprise an IED system configured to, among other things, detect HIF events and implement suitable protective actions in response. Components 202-212 of system 200 may be implemented in an IED using hardware, software, firmware, and/or any combination thereof. As illustrated, a current signal 214 may be received as an input to an interharmonic extraction module 202. The current signal 214 may be generated by, for example, a current transformer and/or other associated current measurement device associated with the system 200, and may provide an indication of current flow at a particular location of an electric power delivery system monitored by system 200 (e.g., a location on a feeder line, a transmission line, etc.).

The interharmonic extraction module 202 may extract interharmonic content 216 included in the received current signal 214. Interharmonic content 216 extracted by the interharmonic extraction module 202 over time may be provided to a reference module 204. Based on interharmonic content 216 provided to the reference module 204 over time, reference module 204 may generate and/or store a dynamically updated reference and/or indication of an amount of interharmonic content (e.g., an average amount) of the received current signal 214 over time. In certain embodiments, this dynamic reference and/or indication may represent an average interharmonic content of received current signals 214 over time associated with normal system noise (e.g., interharmonic signal levels under normal load conditions), and may be utilized in differentiating interharmonic signals attributed to HIF events from interharmonic signals associated with normal system noise.

Difference module 208 may be provided the reference generated by the reference module 204 and the instantaneous extracted interharmonic content signal 216 as inputs, and may calculate a difference between the reference and the instantaneous extracted interharmonic content signal 216. This calculated difference may be indicative of an amount that the instantaneous extracted interharmonic content signal 216 varies from normal system noise levels.

The calculated difference may be provided to an interharmonic activity counting module 210. The interharmonic activity counting module 210 may count a number of occurrences of the difference calculated by the difference module 208 exceeding a defined threshold. In certain embodiments, the defined threshold may be provided by a detection threshold tuning module 206. The threshold maintained and/or provided by the detection threshold tuning module 206 to the interharmonic activity counting module 210 may be calculated by the detection threshold tuning module 206 based on the reference generated by the reference module 204 and/or interharmonic activity information 218 generated by the interharmonic activity counting module 210. Based on this information, the threshold maintained and/or provided by the detection threshold tuning module 206 may be dynamically updated over time.

A number of occurrences of the threshold being exceeded as well as magnitudes of the occurrences may be provided to interharmonic decision logic 212. Based on the magnitudes and the number and/or rates of occurrences of the interharmonic threshold being exceeded, the interharmonic decision logic 212 may identify the occurrence of an HIF event. In response, the interharmonic decision logic 212 may generate an alarm signal 222 and/or a fault signal 220. Based on these signals, system 200 and/or an associated IED or system may implement a suitable protective action (e.g., tripping a breaker to isolate a fault) to mitigate potentially unsafe conditions caused by an HIF event.

Figure 3:
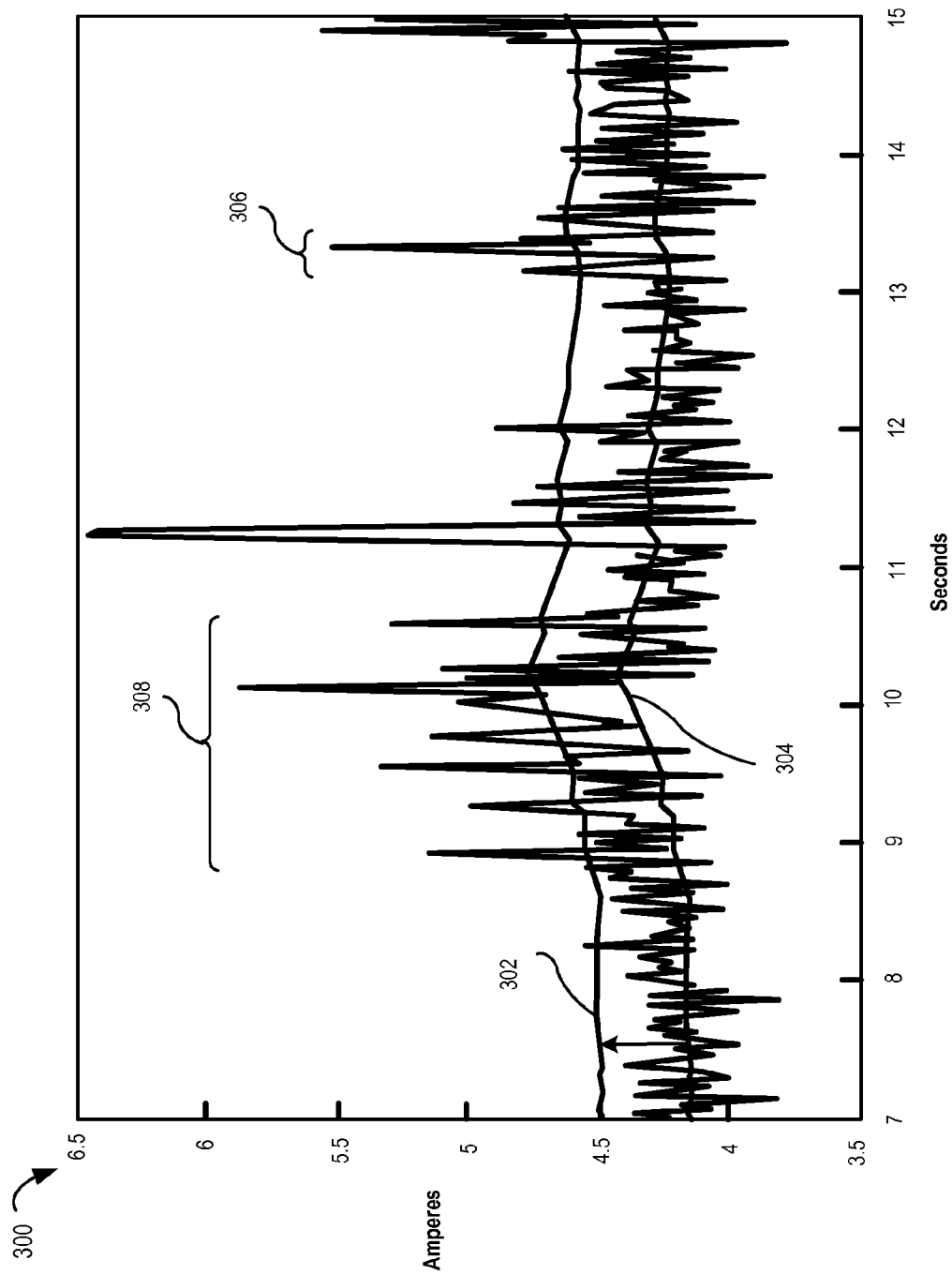
FIG. 3 is a graph illustrating adaptive tuning that may be used in high-impedance fault detection consistent with embodiments disclosed herein.

FIG. 3 is a graph 300 illustrating adaptive tuning used in HIF detection consistent with embodiments disclosed herein. Particularly, the graph 300 illustrates adjustment of HIF detection thresholds 302 based on changes to instantaneous interharmonic content in measured current signals over time. As illustrated, an average of interharmonic content 304 over time of the current signal may be maintained. In certain embodiments, the average over time 304 may be associated with normal system interharmonic noise. An HIF detection threshold 302 may be updated as the average interharmonic content 304 of the signal changes. For example, as illustrated, when the average interharmonic content 304 increases, the HIF detection threshold 302 may also increase.

In certain embodiments, HIF detection logic may identify an HIF event when interharmonic content exceeds the detection threshold 302 by a certain amount and/or by a certain number of times in a given period. For example, as illustrated, interharmonic content during period 308 exceeds the detection threshold 302 frequently by a large magnitude. Such behavior may be indicative of an HIF event, and HIF detection logic may identify the event accordingly. Inharmonic content during period 306, however, exceeds the threshold 302 less frequently, which may not be indicative of an HIF event. Accordingly, the HIF detection logic may not identify an HIF event based on inharmonic activity during period 306.

In certain embodiments, a number of times and/or a duration of a period during which interharmonic content exceeds detection threshold 302 triggering an HIF event, may depend and/or be adjusted based on a magnitude of the interharmonic content exceeding the threshold 302. For example, if interharmonic content exceeds the detection threshold 302 by a relatively large magnitude, a number of threshold crossings and/or a detection period used by HIF detection logic may be relatively small and/or short. Similarly, if interharmonic content exceeds the threshold 302 by a relatively small magnitude, the number of threshold crossings and/or the detection period used by HIF detection logic may be relatively larger and/or long.

Figure 4:
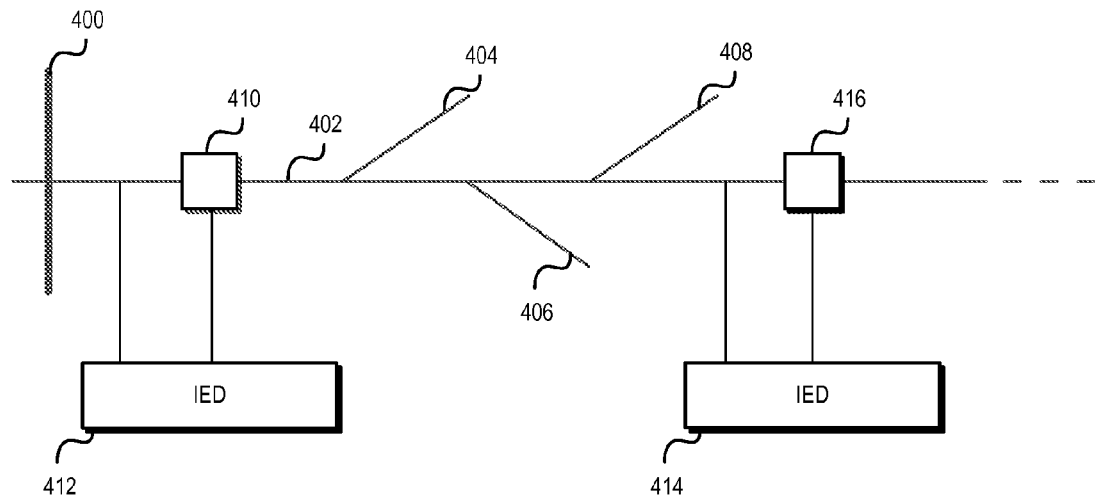
FIG. 4 illustrates a simplified one-line diagram of an electric power delivery system consistent with embodiments disclosed herein.

FIG. 4 illustrates a simplified one-line diagram of an electric power delivery system consistent with embodiments disclosed herein. As illustrated, a distribution bus 400 may be electrically coupled to a distribution feeder line 402 having a plurality of feeder lines 404-408 leading therefrom (e.g., feeder lines leading to one or more loads or the like). IED 412 may monitor certain measured parameters of a location of the feeder line 402 including, among other things, a current flow through the feeder line at the monitored location. For example, IED 412 may be associated with a distribution substation location of an electric power delivery system. IED 412 may be communicatively coupled with a breaker 410 that may be configured to disconnect a portion of the electric power delivery system when actuated by IED 412 (e.g., in response to IED 412 detecting an HIF event or the like). IED 414 may similarly monitor measured parameters (e.g., current) of another location of the feeder line 402 and be configured to actuate (e.g., trip) a communicatively coupled breaker 416 upon detecting an HIF event.

Figure 5:
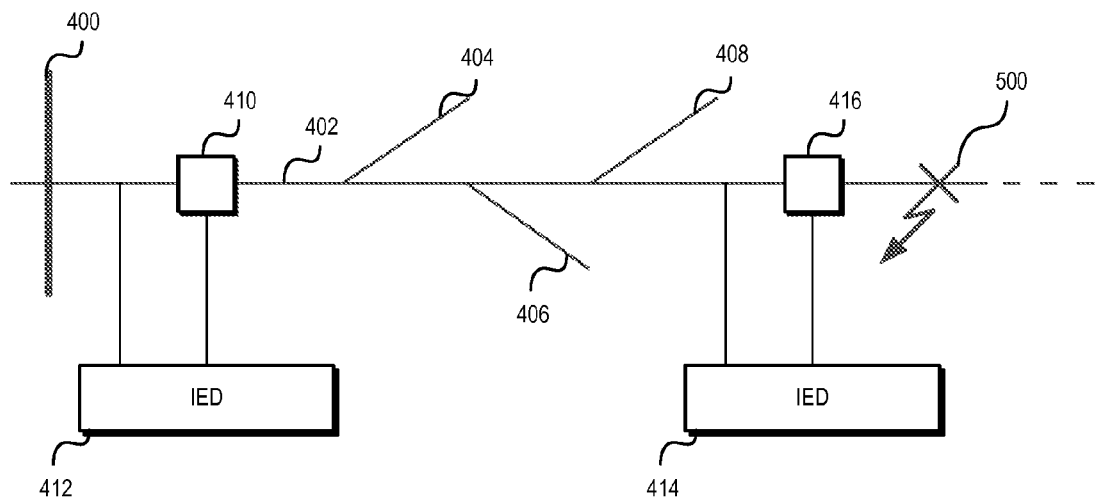
FIG. 5 illustrates a simplified one-line diagram of an electric power delivery system experiencing a high-impedance fault consistent with embodiments disclosed herein.

FIG. 5 illustrates a simplified one-line diagram of an electric power delivery system experiencing an HIF 500 consistent with embodiments disclosed herein. As illustrated, an HIF 500 may occur on the distribution feeder line 402 due to a variety of conditions (e.g., when tree or other object contacts the line and/or when a conductor contacts the ground). IEDs 412, 414 may monitor interharmonic content of measured current signals on the distribution feeder line 402. Based on the monitored interharmonic content, IEDs 412, 414 may identify the occurrence of the HIF event 500 on the distribution feeder line 402 and take one or more suitable protective action to mitigate potentially unsafe conditions and damage to the electric power delivery system. For example, upon detecting the occurrence of the HIF event 500, IED 414 may trip breaker 416, thereby isolating the HIF 500 from the electric power delivery system due to IED 414 monitoring a location further away from the distribution bus 400 than IED 412.

Figure 6:
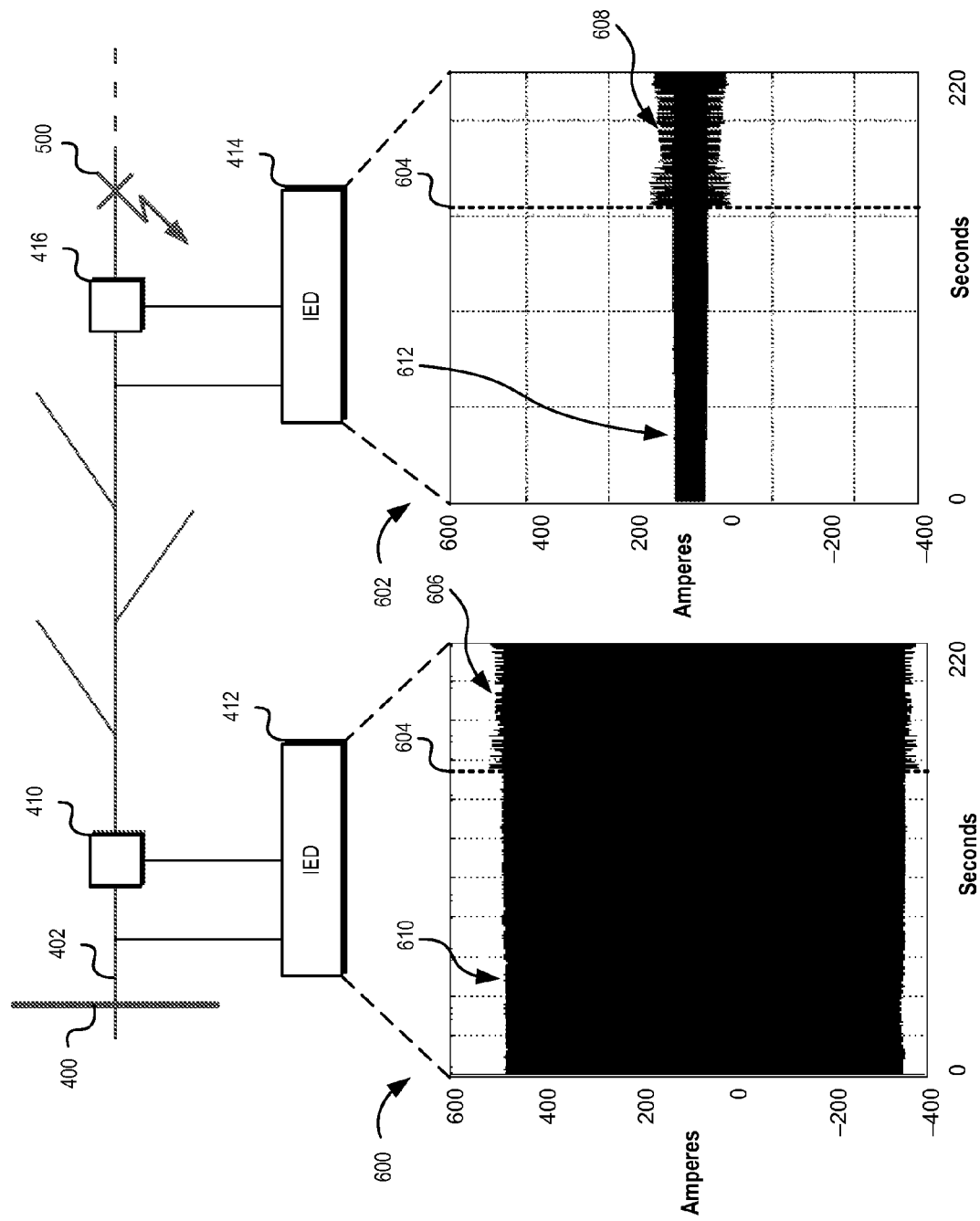
FIG. 6 illustrates exemplary current signals associated with a high-impedance fault at two points in an electric power delivery system consistent with embodiments disclosed herein.

FIG. 6 illustrates exemplary current signals 600, 602 associated with an HIF event 500 and an associated simplified one-line diagram of an electric power delivery system consistent with embodiments disclosed herein. Current signal 600 may represent a current over time measured by IED 412 and current signal 602 may represent a current over time measured by IED 414. As illustrated, current signal 602 measured by IED 414 may be lower than current signal 600 measured by IED 412. For example, due to a plurality of feeder lines being located between the locations monitored by IEDs 412 and 414, the load current measured by IED 414 (e.g., an IED associated with a recloser) may be lower than the load current measured by IED 412 (e.g., an IED associated with a distribution substation).

An HIF 500 may occur on the distribution feeder line 402 at a time 604. As illustrated, the HIF event 500 may introduce additional fault current 606, 608 to the current signals 600, 602. Relative to normal system current and noise 610, 612 preceding time 604 corresponding to the HIF event 500, fault current 608 measured by IED 414 may be larger relative to system current and noise 612 than fault current 606 measured by IED 412 due to the proximity of IED 414 to the HIF event 500 relative to IED 412. That is, fault current signal-to-load ratios measured by IED 414 may be higher than that measured by IED 412 due to its relative proximity to the HIF event 500 and due to the lower current carried by distribution feeder line 402 at the point monitored by IED 414. For example, the magnitude of fault current 608 measured by IED 414 is larger than the system current and noise 612 relative to the magnitude of fault current content 606 measured by IED 412. Accordingly, IED 414 may more accurately detect the HIF event 500 based on fault current and/or interharmonic content 608 than IED 412. Moreover, there is a relatively high current increase measured by IED 414 than IED 412 following the HIF event 500. In certain embodiments, this may also allow IED 414 to detect the HIF event 500 more quickly than IED 412.

In certain embodiments, relative magnitudes of instantaneous fault current 606, 608 and/or signal-to-noise ratios of fault current 606, 608 relative to system noise 610, 612 may be utilized to determine a location of a fault relative to IEDs 412, 414. For example, as illustrated, relative magnitudes of fault current 606, 608 and signal-to-noise ratios of instantaneous fault current 606, 608 relative to system current and noise 610, 612 measured by IED 414 are higher than those measured by IED 412. Accordingly, it may be determined that the location of the electric power delivery system monitored by IED 414 is closer to the HIF event 500 than the location monitored by IED 412. In certain embodiments, fault location information may be stored by IEDs 412, 414 and/or another IED communicatively coupled therebetween.

In certain embodiments, fault location information may be utilized in coordinating one or more protective actions implemented by IEDs 412, 414 and/or other IEDs to mitigate potentially unsafe conditions and damage to the electric power delivery system. Protective actions may be prioritized based on a location of an IED relative to an HIF event 500. For example, based on a determination that IED 414 is located nearer to HIF event 500 than IED 412, IED 414 may implement a protective action to mitigate unsafe conditions caused by the HIF event 500. In certain embodiments, the protective action may include tripping a breaker 416, thereby disconnecting the HIF 500 from the electric power delivery system. If such a prioritized protective action effectively resolves the HIF 500 (i.e., if IED 412 no longer detects an HIF after the protective action), additional protective actions may not need be implemented. If, however, the HIF condition is not resolved, additional protective actions may be implemented and/or other IEDs (e.g., IED 412 may trip breaker 410). Moreover, coordination of such protective actions may also provide additional redundancy, such that if one proactive action fails to resolve the HIF 500, additional protective actions may be implemented until the HIF 500 is resolved.

Figure 7:
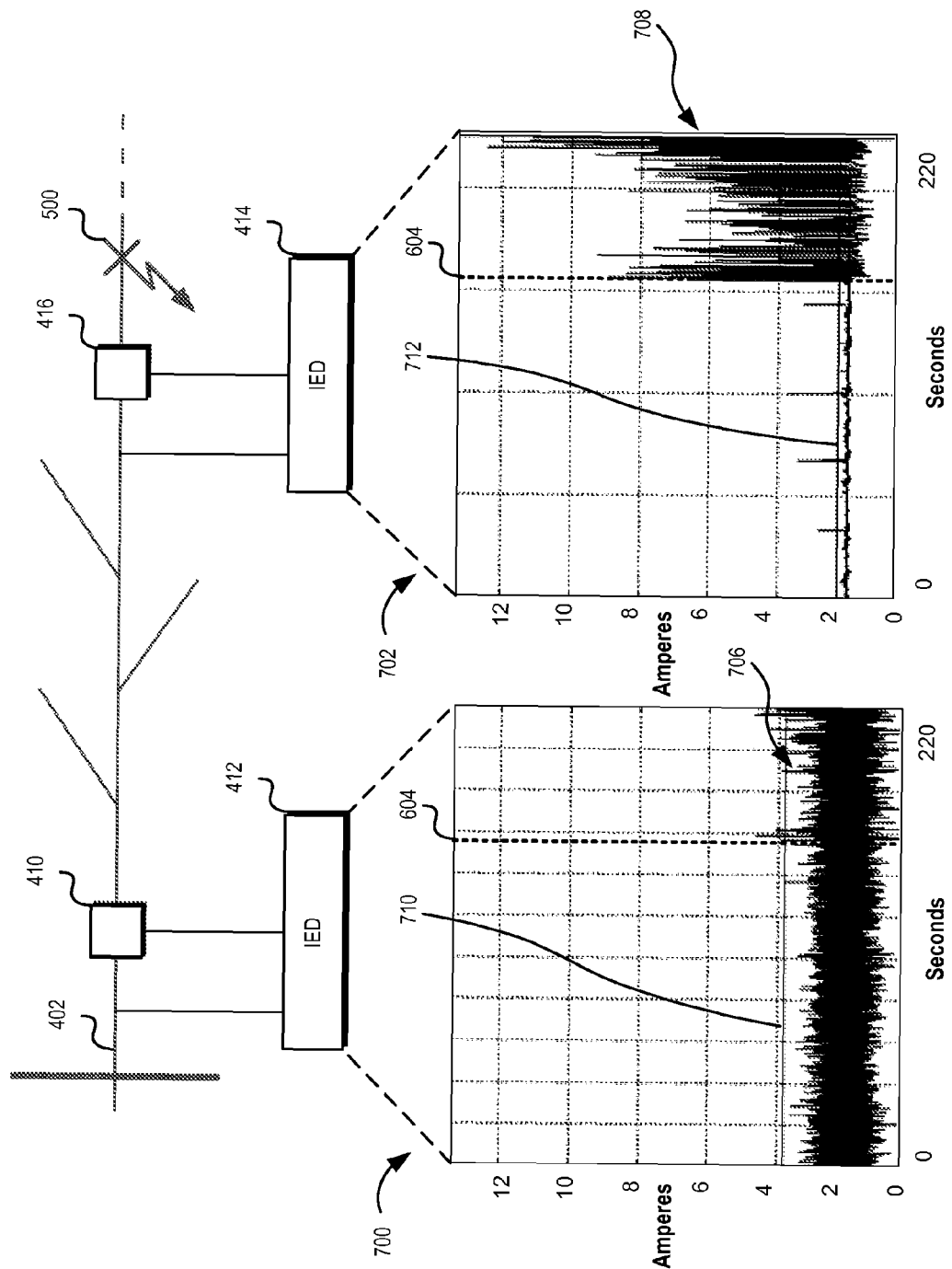
FIG. 7 illustrates exemplary interharmonic current signals associated with a high-impedance fault at two points in an electric power delivery system consistent with embodiments disclosed herein.

FIG. 7 illustrates signals 700, 702 associated with an HIF event 500 and an associated simplified one-line diagram of an electric power delivery system consistent with embodiments disclosed herein. Signal 700 may represent a difference between an interharmonic current and an interharmonic current reference over time measured by IED 412 and signal 702 may represent a difference between an interharmonic current and an interharmonic current reference current over time, as measured by IED 414. At time 604, an HIF 500 may occur on the distribution feeder line 402. The HIF 500 may introduce interharmonic content associated with the fault into current signals along the line 402. Accordingly, signals 700, 702 may include increased interharmonic content 706, 708 following the HIF event 500 due to interharmonic content introduced by the fault that is larger than average interharmonic content associated with system noise.

In certain embodiments, a number of times the signals 700, 702 exceed one or more thresholds 710, 712 may be counted. In addition, a magnitude of the signals 700, 702 when the signals 700, 702 cross the thresholds 710, 712 may be recorded. This information may be utilized, at least in part, in detecting the occurrence of an HIF event 500, determining a relative location of the event 500, and/or in implementing one or more protective actions in connection with the same. As illustrated, because IED 414 is located nearer to the HIF event 500, the magnitude of the interharmonic content 708 may be relatively larger than interharmonic content 706. Accordingly, IED 414 may more accurately and/or quickly detect the HIF event 500 than IED 412 and may implement one or more initial coordinated protective actions in response.

In some embodiments, thresholds 710, 712 utilized to detect and/or identify HIF event 500 may be adaptively tuned to account for normal system noise levels, thereby increasing the accuracy of HIF event detection and/or identification. For example, in some embodiments IEDs 412, 414 may maintain a dynamic reference over time of interharmonic signals included in measured current signals. This long term reference may be utilized as a threshold for differentiating interharmonic signals attributed to normal system noise from interharmonic signals 706, 708 associated with HIF events (e.g., HIF event 500).

Figure 8:
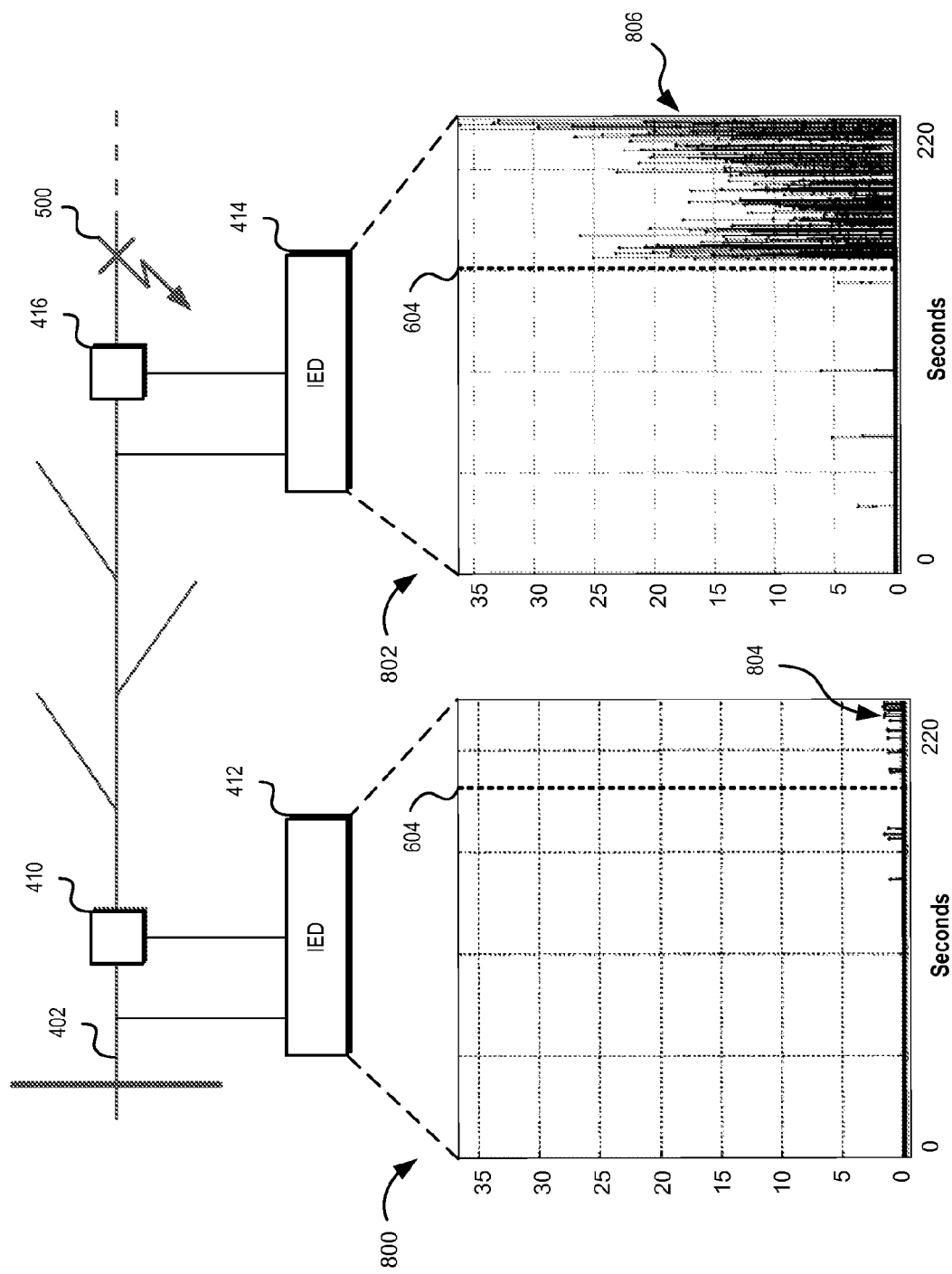
FIG. 8 illustrates an exemplary interharmonic ratio signal associated with a high-impedance fault at two points in an electric power delivery system consistent with embodiments disclosed herein.

FIG. 8 illustrates exemplary interharmonic measurement signals 800, 802 associated with an HIF 500 and an associated simplified one-line diagram of an electric power delivery system consistent with embodiments disclosed herein. Particularly, signal 800 indicates a number of times and associated ratio magnitudes 804 of interharmonic content measured by IED 412 crossing a detection threshold. Similarly, signal 802 indicates a number of times and associated ratio magnitudes of interharmonic content 806 measured by IED 414 crossing a detection threshold.

Signal 800 may represent a difference between an instantaneous measured interharmonic current and an interharmonic current reference over time measured by IED 412 and signal 802 may represent a difference between an instantaneous measured interharmonic current and an interharmonic current reference over time measured by IED 414. At time 604, an HIF 500 may occur on the distribution feeder line 402. The HIF 500 may introduce interharmonic content associated with the fault into current signals along the line 402. Accordingly, signals 800, 802 may include increased interharmonic content 804, 806 following the HIF event 500 due to measured instantaneous interharmonic content introduced by the fault that is larger than the reference interharmonic current associated with system noise. As illustrated, because IED 414 is located nearer to the HIF event 500, the number of times and ratio magnitudes of interharmonic content 806 crossing a detection threshold may both be larger than the same measurements made by IED 412. Accordingly, IED 414 may detect the HIF event 500 more accurately and/or quickly than IED 412 and may implement one or more initial coordinated protective actions in response.

Figure 9:
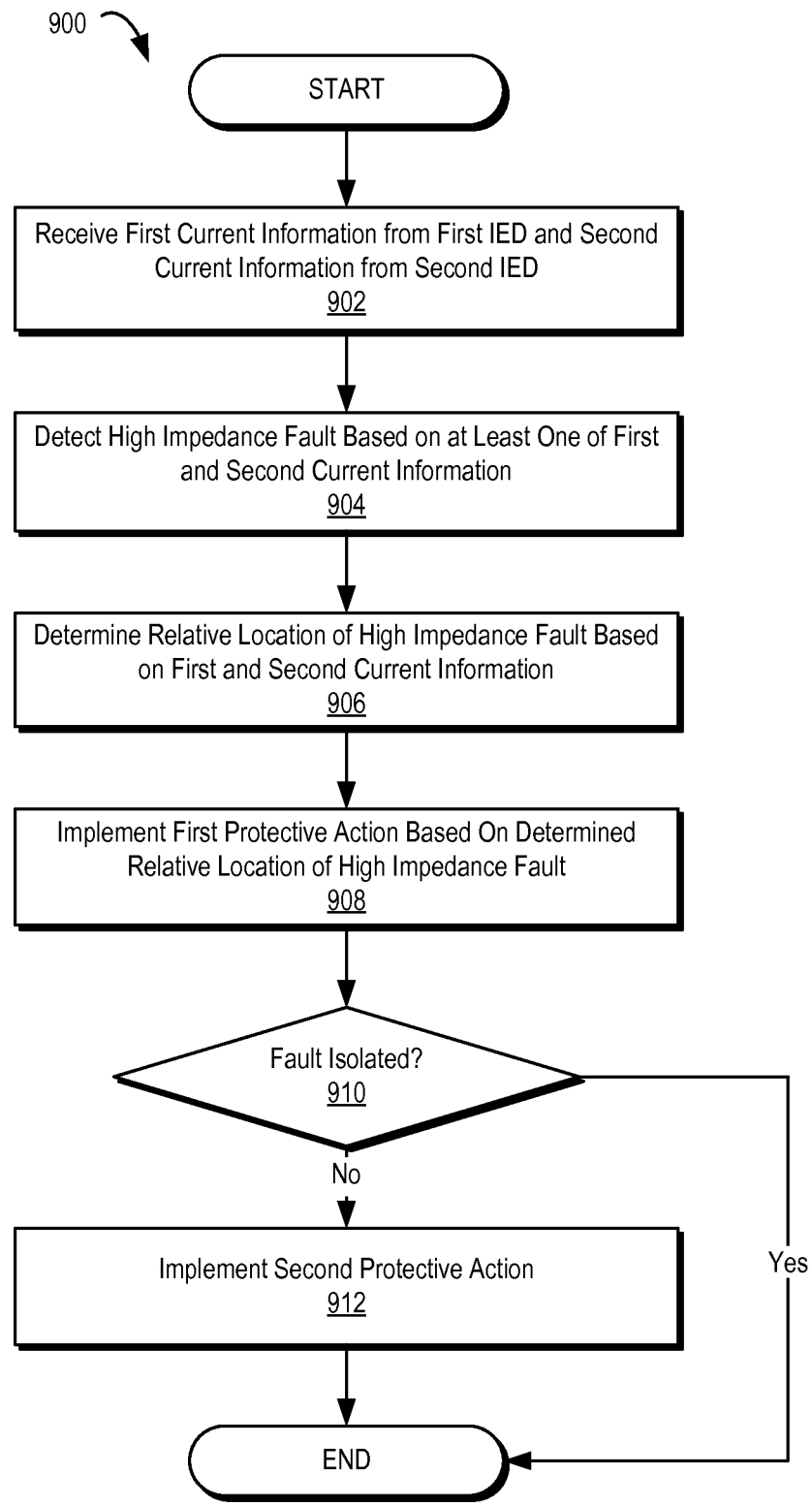
FIG. 9 illustrates a flow chart of a method for monitoring and protecting an electric power delivery system consistent with embodiments disclosed herein.

FIG. 9 illustrates a flow chart of a method 900 for monitoring and protecting an electric power delivery system consistent with embodiments disclosed herein. In certain embodiments, method 900 may be performed by a central IED communicatively coupled with a first IED and a second IED. Among other things, the central IED may be configured to coordinate detection of HIF events with the first and second IEDs and to implement one or more prioritize protective actions by at least the first IED and the second IED in response to the same. In further embodiments, the first IED or the second IED may perform the functions described with respect to the central IED, together with the functions described with respect to either the first IED or the second IED. Still further, various embodiments may implement a variety of other distributed control schemes consistent with the present disclosure.

At 902, the central IED may receive a first current representation from the first IED and second current representation from the second IED. In certain embodiments, the first current representation may be associated with a first location of an electrical power delivery system monitored by the first IED, and the second current representation may be related to a location associated with a second location of the electrical power delivery system monitored by the second IED.

Based on at least one of the first and second current representations, an HIF may be detected at 904. In certain embodiments, an HIF may be detected when interharmonic content exceeding one or more detection thresholds associated with an HIF event is observed in the first and/or second current representation. In some embodiments, an HIF may be detected when the interharmonic content exceeds the detection thresholds by a certain magnitude and/or exceeds the detection thresholds a particular number of times in a given period. In certain embodiments, the one or more detection thresholds may be dynamically adjusted based on previously received current information to more accurately identify the occurrence of HIF events. Previously received current information may include an average current flow over a period of time, trends based on a time of day, information regarding factors that affect loading (e.g., weather conditions, connection/disconnection of large loads, etc.). In some embodiments, interharmonic content associated with HIF faults may be extracted from the first and second current representations by subtracting average interharmonics over time (e.g., interharmonics associated with normal system noise) from instantaneous interharmonics included in the current information.

At 906, a location of the HIF relative to the first location monitored by the first IED and the second location monitored by the second IED may be determined. In certain embodiments, based on relative signal-to-noise ratios of interharmonic content associated with ah HIF event included in the first current representation and the second current representation, a location of the HIF relative to the first and the second locations may be determined. For example, if the relative signal-to-noise ratios and/or magnitudes of interharmonic content associated with an HIF included in the second current representation is higher than that included in the first current representation, it may be determined that the second location monitored by the second IED is closer to the HIF than the first location monitored by the first IED.

At 908, a first protective action may be implemented by the first IED and/or the second IED based on the relative location of the HIF determined at 906. In certain embodiments, protective actions may be prioritized based on a location of an IED relative to an HIF. For example, based on a determination at 906 that the second IED is located nearer to an HIF than the first IED, the second IED may implement a first protective action to mitigate potentially unsafe conditions caused by damage to the electrical power delivery system caused by the HIF event. In certain embodiments, the protective action may include tripping a breaker, thereby disconnecting and/or isolating the HIF from the electric power delivery system.

At 910, a determination may be made as to whether the first protective action successfully isolated the HIF. For example, a determination may be made whether the first current information measured by the first IED contains interharmonics associated with an HIF after implementation of the first protective action. If the first protective action successfully isolates the HIF from the electric power delivery system, the method 900 may end. If, however, the first protective action does not isolate the HIF from the system, the method may proceed to 912 and a second protective action may be implemented (e.g., tripping a second breaker by the first and/or second IED).

Figure 10:
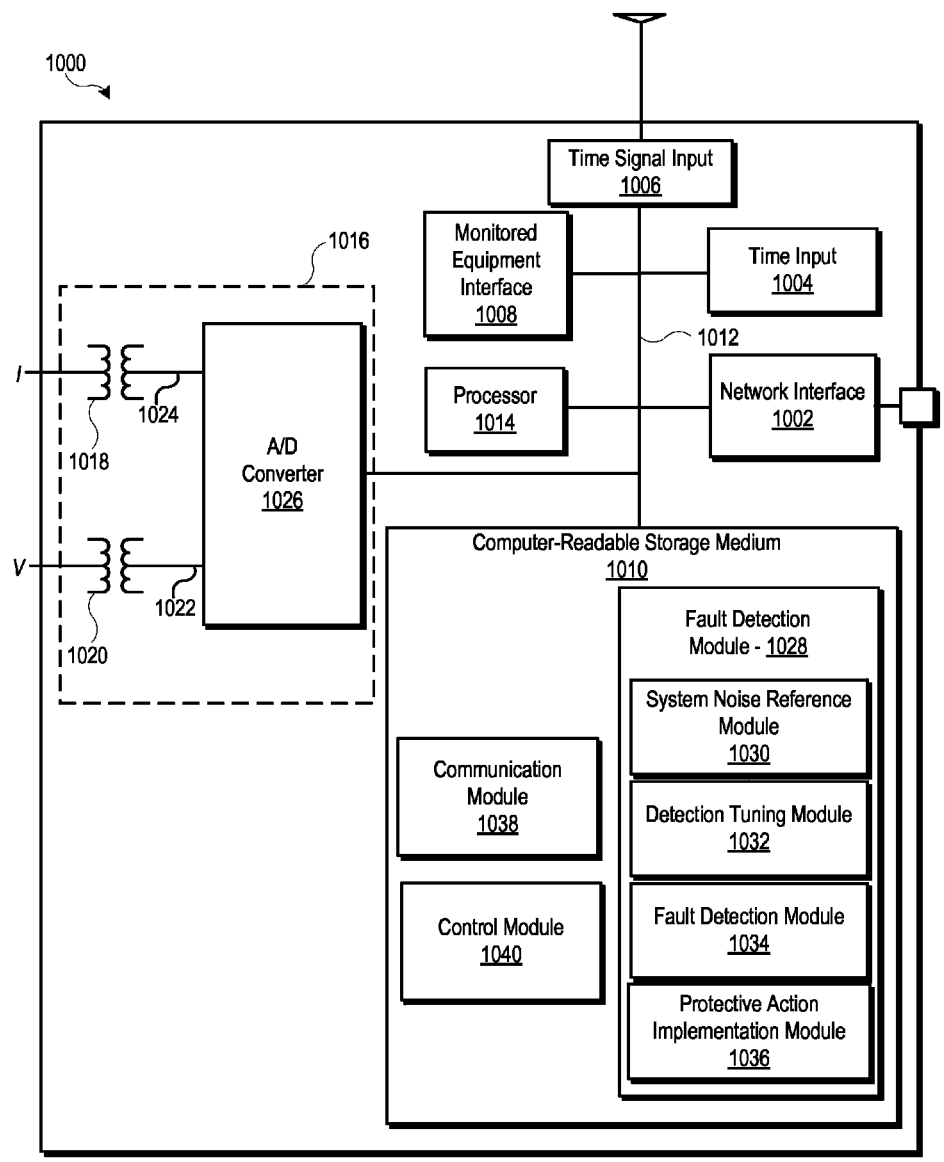
FIG. 10 illustrates a functional block diagram of an intelligent electronic device consistent with embodiments disclosed herein.

FIG. 10 illustrates a block diagram of an IED 1000 consistent with embodiments disclosed herein. Embodiments of the IED 1000 may be utilized to implement embodiments of the systems and methods disclosed herein. For example, the IED 1000 may be configured to detect HIF events and implement one or more suitable protective actions in response to the same. The IED 1000 may also be configured to coordinate its actions and/or the actions one or more other IEDs based, at least in part, on information provided by the other IEDs.

IED 1000 may include a network interface 1002 configured to communicate with a communication network. IED 1000 may also include a time input 1004, which may be used to receive a time signal. In certain embodiments, a common time reference may be received via network interface 1002, and accordingly, a separate time input 1004 and/or Global Navigation Satellite System (GNSS) time input 1006 may not be necessary. One such embodiment may employ the IEEE 1588 protocol. Alternatively, a GNSS input 1006 may be provided in addition to, or instead of, time input 1004.

A monitored equipment interface 1008 may be configured to receive equipment status information from, and issue control instructions to a piece of monitored equipment, such as an electrical generator, breaker, voltage regulator controller, and/or the like. According to certain embodiments, the monitored equipment interface 1008 may be configured to interface with a variety of equipment of an electric power delivery system. In certain embodiments, the equipment status information and/or control instructions may be communicated over the network interface 1002.

A computer-readable storage medium 1010 may be the repository of one or more modules and/or executable instructions configured to implement any of the processes described herein. A data bus 1012 may link monitored equipment interface 1008, time input 1004, network interface 1002, GNSS time input 1006, and the computer-readable storage medium 1010 to a processor 1014.

Processor 1014 may be configured to process communications received via network interface 1002, time input 1004, GNSS time input 1006, and/or monitored equipment interface 1008. Processor 1014 may operate using any number of processing rates and architectures. Processor 1014 may be configured to perform various algorithms and calculations described herein using computer executable instructions stored on computer-readable storage medium 1010. Processor 1014 may be embodied as a general purpose integrated circuit, an application specific integrated circuit, a field-programmable gate array, and/or other programmable logic devices.

In certain embodiments, IED 1000 may include a sensor component 1016. In the illustrated embodiment, sensor component 1016 is configured to gather data from a location of the electric power delivery system (not shown) using a current transformer 1018 and/or a voltage transformer 1020. Voltage transformer 1020 may be configured to step-down the power system's voltage (V) to a secondary voltage waveform 1022 having a magnitude that can be readily monitored and measured by IED 1000. Similarly, current transformer 1018 may be configured to proportionally step-down the power system's line current (I) to a secondary current waveform 1024 having a magnitude that can be readily monitored and measured by IED 1000. Although not separately illustrated, the voltage and current signals V and I may be secondary signals obtained from equipment instruments designed to obtain signals from power system equipment. For example, a secondary voltage signal V may be obtained from a potential transformer (PT) in electrical communication with a conductor. A secondary current signal I may be obtained from a current transformer (CT) in electrical communication with a conductor. Various other instruments may be used to obtain signals from electric power delivery systems including, for example, Rogowski coils, optical transformers, and the like.

An analog-to-digital converter 1026 may multiplex, sample and/or digitize the measured voltage and/or current signals to form corresponding digitized current and voltage signals. Similar values may also be received from other distributed controllers, station controllers, regional controllers, or centralized controllers. The values may be in a digital format or other format. In certain embodiments, sensor component 1016 may be utilized to monitor current signals associated with portion of an electric power delivery system and/or detect interharmonic content associate with HIF events included in such monitored current signals. Further, sensor component 1016 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A/D converter 1026 may be connected to processor 1014 by way of a bus 1012, through which digitized representations of current and voltage signals may be transmitted to processor 1014. As described above, processor 1014 may be used to apply equipment status, measurements, and derived values to an IED module. Processor 1014 may be used to detect the occurrence of HIF conditions and issue control instructions in response to the same (e.g., instructions implementing protective actions).

It should be noted that a separate device may be used in place of a sensor component 1016 for providing signals from the electric power delivery system to the IED 1000. Indeed, a separate device may be configured to obtain signals from the electric power delivery system (such as voltage and/or current signals), and create digitized representations of the signals (for example current and voltage signals), apply a time stamp, and/or supply such information to the IED 1000. Further, the separate device may be configured to supply equipment status and/or measurements such as voltage and/or current magnitudes and/or angles along with time stamps to the IED 1000. In certain embodiments, the information that has been described as received from sensor component 1016 is instead received from network interface 1002.

A monitored equipment interface 1008 may be configured to receive status information from, and issue control instructions to a piece of monitored equipment. Monitored equipment interface 1008 may be configured to issue control instructions to one or more pieces of monitored equipment. According to some embodiments, control instructions may also be issued via network interface 1002. Control instructions issued via network interface 1002 may be transmitted, for example, to other distributed controllers, coordination controllers, IEDs, or the like (not shown), which in turn may issue the control instruction to a piece of monitored equipment. Alternatively, the piece of monitored equipment may receive the control instruction directly via its own network interface.

Computer-readable storage medium 1010 may be the repository of one or more modules and/or executable instructions configured to implement certain functions and/or methods described herein. For example, computer-readable storage medium 1010 may include a fault detection module 1028, which may be a repository of the modules and/or executable instructions configured to implement the HIF detection and protection functionalities described herein. The distributed controller module 1028 may include, among others, a system noise reference module 1030, a detection tuning module 1032, a fault detection module 1034, and a protective action implementation module 1036. The computer-readable medium 1010 may further include a communication module 1038 and a control module 1040.

Fault detection module 1034 may be configured to perform certain HIF detection functions described herein. In certain embodiments, the fault detection module 1034 may be configured to identify the occurrence of an HIF based on instantaneous interharmonic content included in a current signal information, that may be provided, for example, by the sensor component 1016. In certain embodiments, the fault detection module 1034 may interface with a system noise reference module 1030, which may store average interharmonic content of a current signal over time. Such information may be used by the fault detection module 1034 in differentiating interharmonic content associated with an HIF from interharmonic content associated with normal system noise.

In further embodiments, the fault detection module 1034 may interface with a detection tuning module 1032 that may provide information utilized in tuning fault detection thresholds. In certain embodiments, such thresholds may be dynamically adapted and/or tuned based on interharmonic content included in signals measured by sensor component 1016 over time. A protective action implementation module 1036 may interface with the fault detection module 1034. Upon receiving an indication from the fault detection module 1034 of a detected HIF event, protective action implementation module 1036 may implement one or more protective actions to mitigate potentially unsafe conditions and damage to an electric power delivery system (e.g., issuing control instructions to trip a breaker and isolate the HIF from the system).

A control module 1040 may be configured for interacting with monitored equipment connected to distributed controller via monitored equipment interface 1008 and/or via network interface 1002. According to some embodiments, control instructions from the control module 1040 may be intended as control instructions for other IEDs and/or monitored equipment located remote to IED 1000. In some cases, control instructions may be only informative or suggestive, meaning that the receiving IED is not obligated to perform the control instruction. Rather, the receiving IED may use the suggested control instruction in coordination with its own determinations and information from other controllers to determine whether it will perform the control instruction. In other cases control instructions may be directive in that they are required actions. Differentiation between informative or suggestive control instructions and mandatory control instruction may be based on information included with the control instruction.

A communication module 1038 may include instructions for facilitating communication of information from IED 1000 to other controllers and/or other components in the electric power delivery system. The communication module 1038 may include instructions on the formatting of communications according to a predetermined protocol. Communication module 1038 may be configured with subscribers to certain information, and may format message headers according to such subscription information.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electrical system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A method for detecting high-impedance faults in an electric power delivery system comprising:
receiving a first current representation associated with a first location of the electric power delivery system;
receiving a second current representation associated with a second location of the electric power delivery system;
determining, based on at least one of the first and second current representations, the occurrence of a high-impedance fault on the electric power delivery system;
determining a relative location of the high-impedance fault based, at least in part, on a relative amount of signal content associated with a high-impedance fault included in the first and second current representations;

coordinating a first protective action by one of a first intelligent electronic device (IED) and a second IED based on the determined relative location of the high-impedance fault, and implementing the first protective action by one of the first IED and the second IED based on the determined relative location.

2. The method of claim 1, wherein the first current representation comprises a measurement by the first IED and the second current representation comprises a measurement by the second IED.

3. The method of claim 1, wherein the first protective action comprises issuing a control signal to electrically isolate a portion of the electric power delivery system including the high-impedance fault.

4. The method of claim 1, further comprising:
   determining the relative location of the high-impedance fault comprises determining that the high-impedance fault is located closer to the first location than then second location; and
   wherein implementing the first protective action comprises the first IED issuing a control signal to electrically isolate a portion of the electric power delivery system including the high-impedance fault.

5. The method of claim 1, wherein determining the occurrence of the high-impedance fault comprises determining that at least one of the first current representation and the second current representation comprises signal content associated with a high-impedance fault.

6. The method of claim 5, wherein determining that at least one of the first current representation and the second current representation comprises signal content associated with a high-impedance fault comprises determining that at least one of the first current representation and the second current representation comprises signal content exceeding a detection threshold.

7. The method of claim 5, wherein determining that at least one of the first current representation and the second current representation comprises signal content associated with a high-impedance fault further comprises determining that at least one of the first current representation and the second current representation comprises signal content exceeding the detection threshold by a number of times in a particular period.

8. The method of claim 7, wherein the particular period is based on a relative magnitude of the signal content.

9. The method of claim 5, wherein determining that at least one of the first current representation and the second current representation comprises signal content associated with a high-impedance fault comprises adjusting at least one of the first current representation and the second current representation by a reference and determining that the adjusted information comprises signal content exceeding a detection threshold.

10. The method of claim 9, wherein the reference comprises an average level of signal content associated with normal system noise.

11. The method of claim 10, wherein the detection threshold is adjusted based on the reference.

12. The method of claim 1, wherein the method further comprises:
   determining, based on at least one of the first and second current representations, that a portion of the electric power delivery system including the high-impedance fault has not been isolated after implementing the first protective action; and implementing a second protective action to isolate the high-impedance fault.

13. The method of claim 12, wherein the first protective action comprises issuing a first control instruction to electrically isolate a first portion of the electric power delivery system and the second protective action comprises issuing a second control instruction to electrically isolate a second portion of the electric power delivery system.

14. An intelligent electronic device (IED) associated with an electric power delivery system, the IED comprising:
   an interface configured to receive first current representation associated with a first location of the electric power delivery system and second current representation associated with a second location of the electric power delivery system;
   a processor communicatively coupled to the interface;
   a computer-readable storage medium communicatively coupled to the processor, the computer-readable storage medium storing instructions that when executed by the processor cause the processor to determine, based on at least one of the first and second current representations, the occurrence of a high-impedance fault on the electric power delivery system, determine a relative location of the high-impedance fault based, at least in part, on a relative amount of signal content associated with a high-impedance fault included in the first and second current representations, coordinating a first protective action by one of a first intelligent electronic device (IED) and a second IED based on the determined relative location of the high-impedance fault, and implement the first protective action by one of the first IED and the second IED based on the determined relative location.

15. The IED of claim 14, wherein the first protective action comprises issuing a control signal, via the interface, to electrically isolate a portion of the electric power delivery system including the high-impedance fault.

16. The IED of claim 14, wherein the first current representation is received from a first IED and the second current representation is received form a second IED and determining the relative location of the high-impedance fault comprises determining that the high-impedance fault is located closer to the first location than then second location and implementing the first protective action comprises instructing the first IED to issue a control signal to trip a breaker to isolate a portion of the electric power delivery system including the high-impedance fault.

17. The IED of claim 14, wherein determining the occurrence of the high-impedance fault comprises determining that at least one of the first current representation and the second current representation comprises signal content associated with a high-impedance fault.

18. The IED of claim 17, wherein determining that at least one of the first current representation and the second current representation comprises signal content associated with a high-impedance fault comprises determining that at least one of the first current representation and the second current representation comprises signal content exceeding a detection threshold.

19. The IED of claim 18, wherein determining that at least one of the first current representation and the second current representation comprises signal content associated with a high-impedance fault comprises adjusting at least one of the first current representation and the second current representation by a reference and determining that the adjusted information comprises signal content exceeding a detection threshold.

20. The IED of claim 14, wherein computer-readable medium further stores instructions configured to cause the processor to determine, based on at least one of the first and second current representations, that a portion of the electric power delivery system including the high-impedance fault has not been isolated after implementing the first protective action and implement a second protective action to isolate the high-impedance fault.

\* \* \* \* \*